US012270234B2

(12) United States Patent
Despreaux

(10) Patent No.: US 12,270,234 B2
(45) Date of Patent: Apr. 8, 2025

(54) VEHICLE DOOR HANDLE ASSEMBLY

(71) Applicant: U-shin Italia S.p.A, Pianezza (IT)

(72) Inventor: Guillaume Despreaux, Pianezza (IT)

(73) Assignee: U-shin Italia S.p.A, Pianezza (IT)

( * ) Notice: Subject to any disclaimer, the term of this patent is extended or adjusted under 35 U.S.C. 154(b) by 110 days.

(21) Appl. No.: 18/193,013

(22) Filed: Mar. 30, 2023

(65) Prior Publication Data

US 2023/0313575 A1 Oct. 5, 2023

(30) Foreign Application Priority Data

Mar. 30, 2022 (EP) .................................... 22165303

(51) Int. Cl.
*E05B 85/10* (2014.01)

(52) U.S. Cl.
CPC .................................. *E05B 85/107* (2013.01)

(58) Field of Classification Search
CPC .......... E05B 85/00; E05B 85/01; E05B 85/10; E05B 85/103; E05B 85/107
USPC ............................................................ 70/208
See application file for complete search history.

(56) References Cited

U.S. PATENT DOCUMENTS 5,092,642 A * 3/1992 Lindmayer ............. E05B 77/42 292/201
5,123,687 A * 6/1992 Pfeiffer ................. E05B 1/0092 292/DIG. 31
2002/0046440 A1* 4/2002 Agostini ................. E05B 81/78 16/110.1
2014/0000167 A1* 1/2014 Patel ..................... E05B 85/103 49/32
2020/0332575 A1* 10/2020 Christensen ............ E05B 85/18
2022/0065003 A1 3/2022 Han et al.

FOREIGN PATENT DOCUMENTS

CN 108547523 A 9/2018
CN 113863796 A 12/2021
KR 102104888 B1 * 4/2020

OTHER PUBLICATIONS

Extended European Search Report issued Sep. 12, 2022 in European Patent Application No. 22165303.3, 5 pages.

* cited by examiner

*Primary Examiner* — Nathan Cumar
(74) *Attorney, Agent, or Firm* — Oblon, McClelland, Maier & Neustadt, L.L.P.

(57) ABSTRACT

A vehicle door handle assembly includes a bracket and a handle, a first extremity of the handle being connected to a first extremity of a first lever, a second extremity of the handle being connected to a first extremity of a second lever, at least one of the first or second lever being connected to its respective first or second extremity of the handle by a pivot-slide connection, wherein the vehicle door handle assembly also comprises a dumper positioned into one of the first or second extremity of the handle in order to dampen the sliding of the extremity of the first or second lever in its pivot-slide connection with the handle when the first extremity of the handle moves from an opening position to a deployed position.

8 Claims, 4 Drawing Sheets

VEHICLE DOOR HANDLE ASSEMBLY

TECHNICAL FIELD

Figure 1:
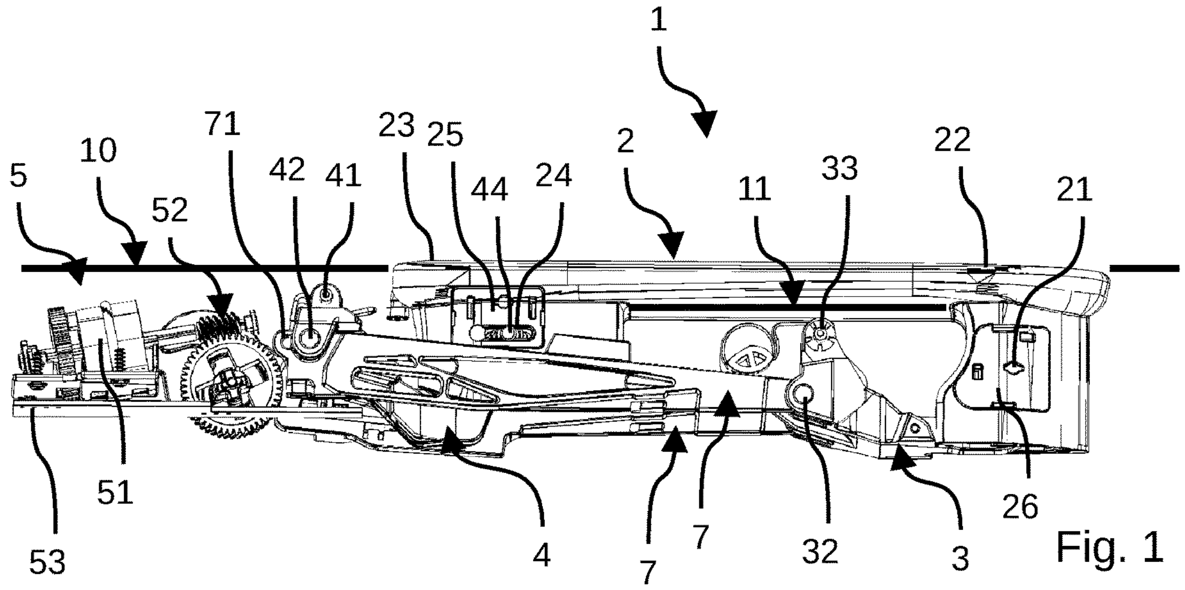

The present invention relates to a vehicle door handle assembly, in particular of the type with a handle translating from a rest position where the handle is retracted and a deployed position where the handle is deployed and can be taken in hand and opened.

BACKGROUND

Such vehicle door handle assemblies have generally three positions: a rest position where the handle is retracted and flush with the vehicle door body, a deployed position where the handle steps out of the vehicle door body and an opening position where the handle is pulled by a user in order to unlock and open the vehicle door. Such vehicle door handle assemblies with a handle translating between its rest position and its deployed position is becoming more common and requested by manufacturers.

When the user releases the handle and it comes back from its opening position to its deployed position, the manufacturers may require a transition with a soft sound in order to increase the feeling quality of the handle to the user. For standard handles which do not have a rest position, it is current to have a dumper positioned between the handle and the vehicle door body or a bracket of the vehicle door handle assembly. However, for vehicle door handle assembly having a rest position, where the handle is retracted and flush with the vehicle door body or a bracket, such method is hardly transposable due to the complexity of the mechanism permitting the movement between the rest position and the deployed position.

A known solution to this problem is to add a damper into the mechanism in order to slow down the return of one extremity of the handle from its opening position to its deployed position. However, this solution has a high cost and is complex to integrate into the mechanism.

One aim of the present invention is to provide an economic and simple solution permitting a transition with a soft sound when the user releases the handle and it comes back from its opening position to its deployed position.

To this end, the invention relates to a vehicle door handle assembly comprising a bracket and a handle, said handle comprising a first extremity and a second extremity opposed to the first extremity, the first extremity of the handle being connected to a first extremity of a first lever, said first lever being designed to be connected to an opening lever to open a latch of the vehicle door, said first lever being designed to rotate between a rest position where the first extremity of the handle is in a rest position, a deployed position where the first extremity of the handle is in a deployed position outside the bracket and an opening position where the first lever actuates the opening lever, the second extremity of the handle being connected to a first extremity of a second lever, said second lever being designed to rotate between a rest position where the second extremity of the handle is in a rest position and a deployed position where the second extremity of the handle is in a deployed position outside the bracket, at least one of the first or second lever being connected to its respective first or second extremity of the handle by a pivot-slide connection, wherein the vehicle door handle assembly also comprises a dumper positioned into one of the first or second extremity of the handle in order to dampen the sliding of the extremity of the first or second lever in its pivot-slide connection with the handle when the first extremity of the handle moves from its opening position to its deployed position.

The dumper could be an elastic part placed at the extremity of the pivot-slide connection, the extremity of the first or second lever pressing the dumper when the handle is in its deployed position.

The dumper could be made of a thermoplastic elastomer.

The thermoplastic elastomer could have a hardness of Shore A between 50 and 60, preferably a hardness of Shore A 55.

The dumper could comprise at least one strip designed to come in contact with the extremity of the first or second lever when the handle is in its deployed position.

The first or second extremity of the handle bearing the pivot-slide connection with the first or second lever could have a hollow compartment, the first or second lever being inserted into this hollow compartment, and the dumper could also be positioned onto this hollow compartment.

The dumper could comprise a recess designed to receive a pin in order to maintain said dumper into the first or second extremity of the handle.

The pin could be a pin of a fixing clip of the extremity of the first 3 or second lever to the first or second extremity of the handle.

Figure 2:
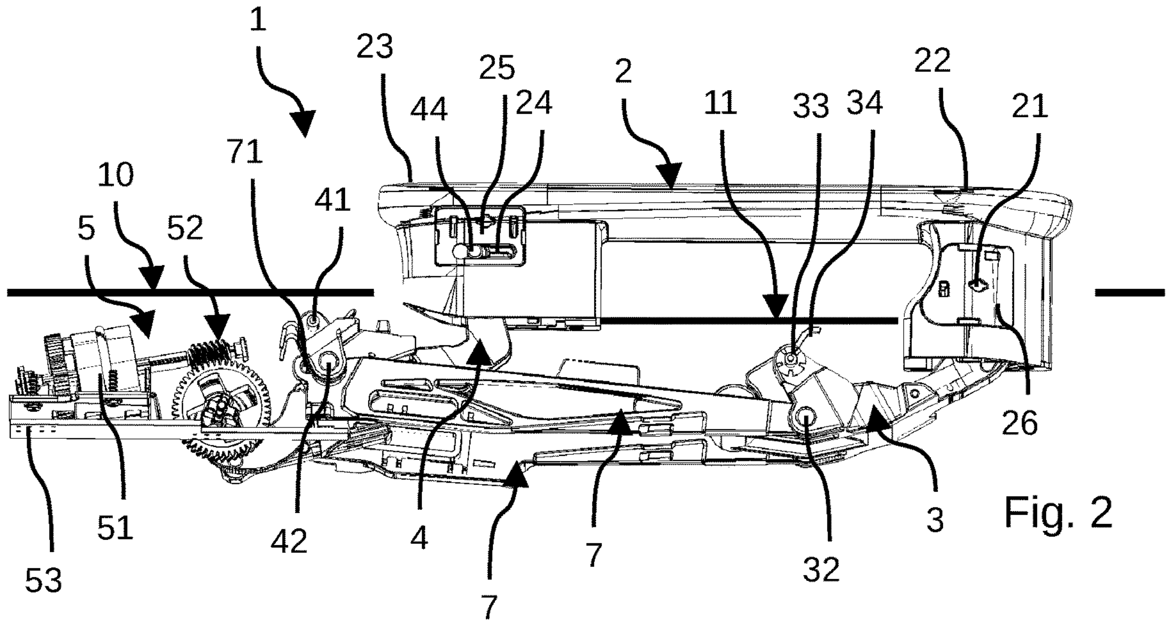
Figure 3:
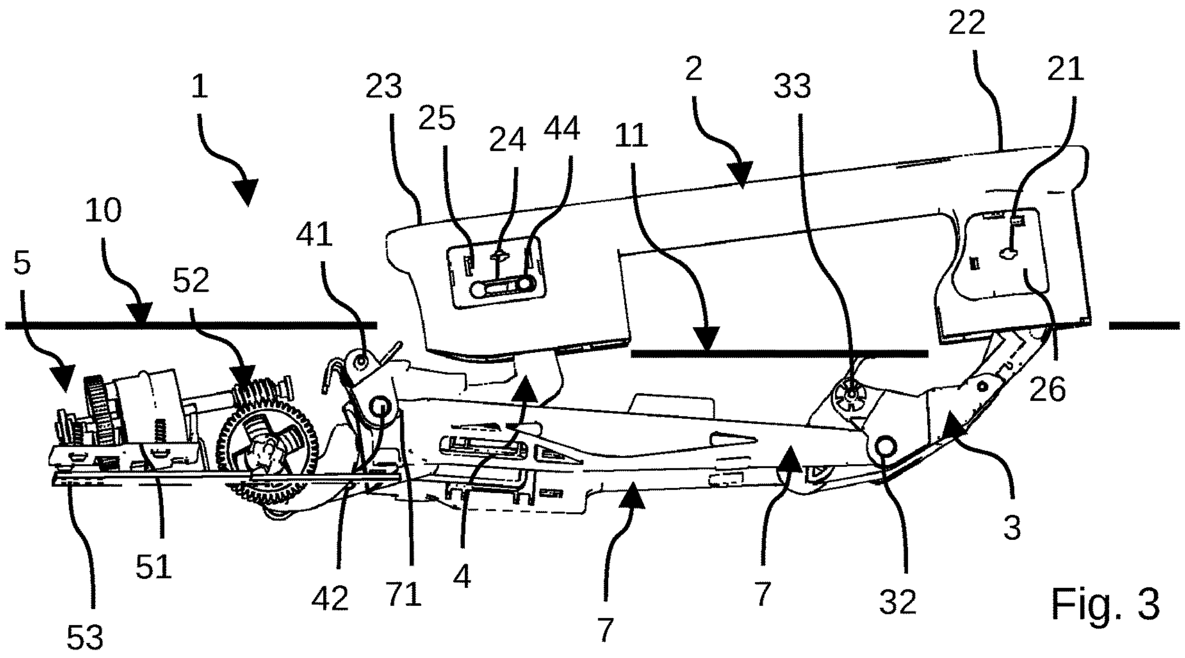
Figure 4:
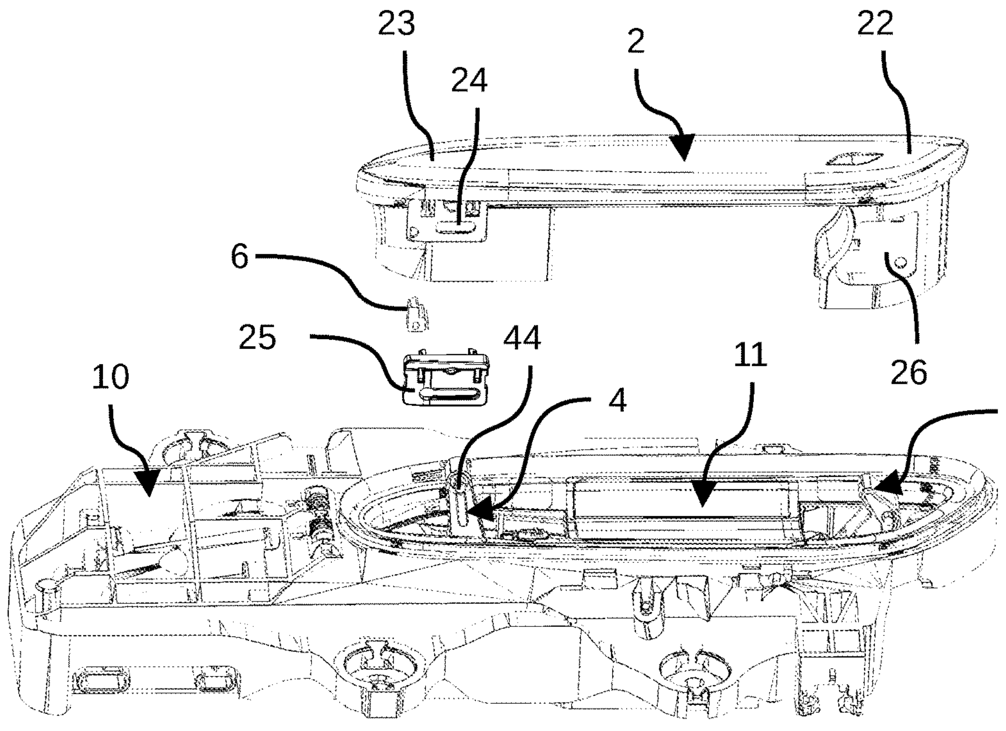
Figure 5:
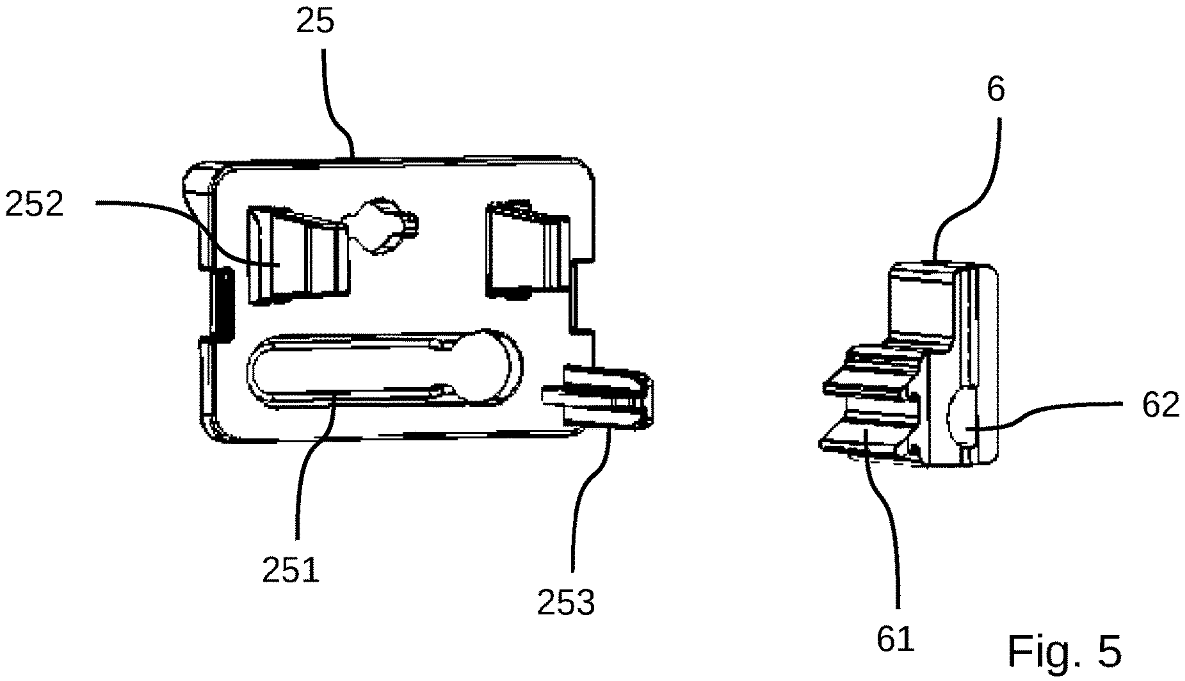
Figure 6:
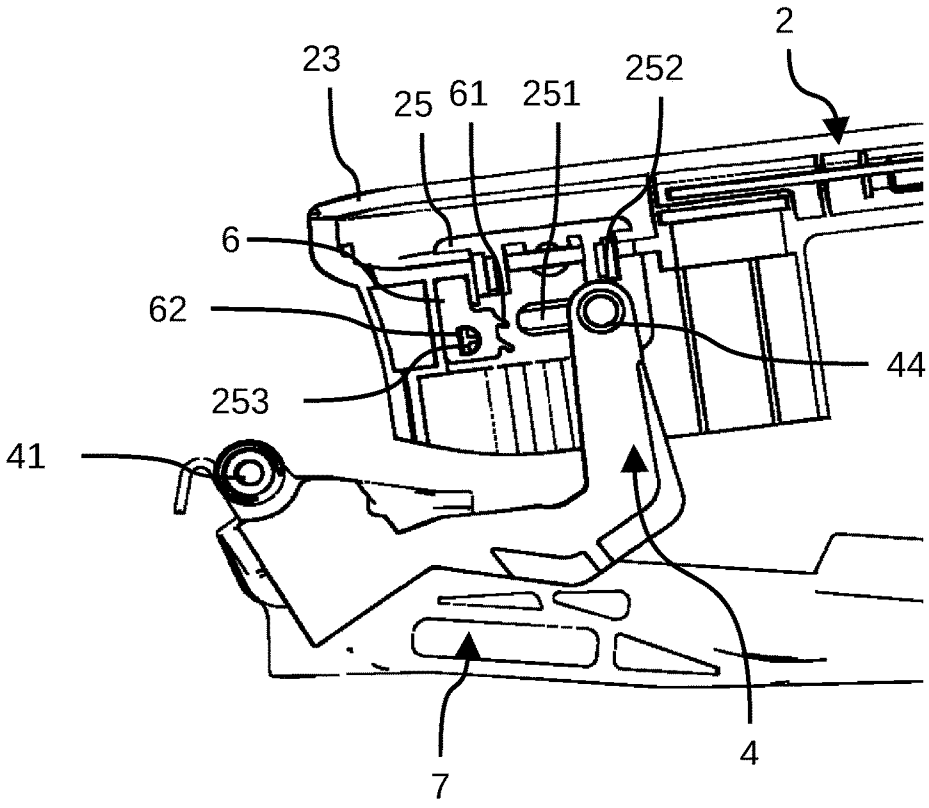
Figure 7:
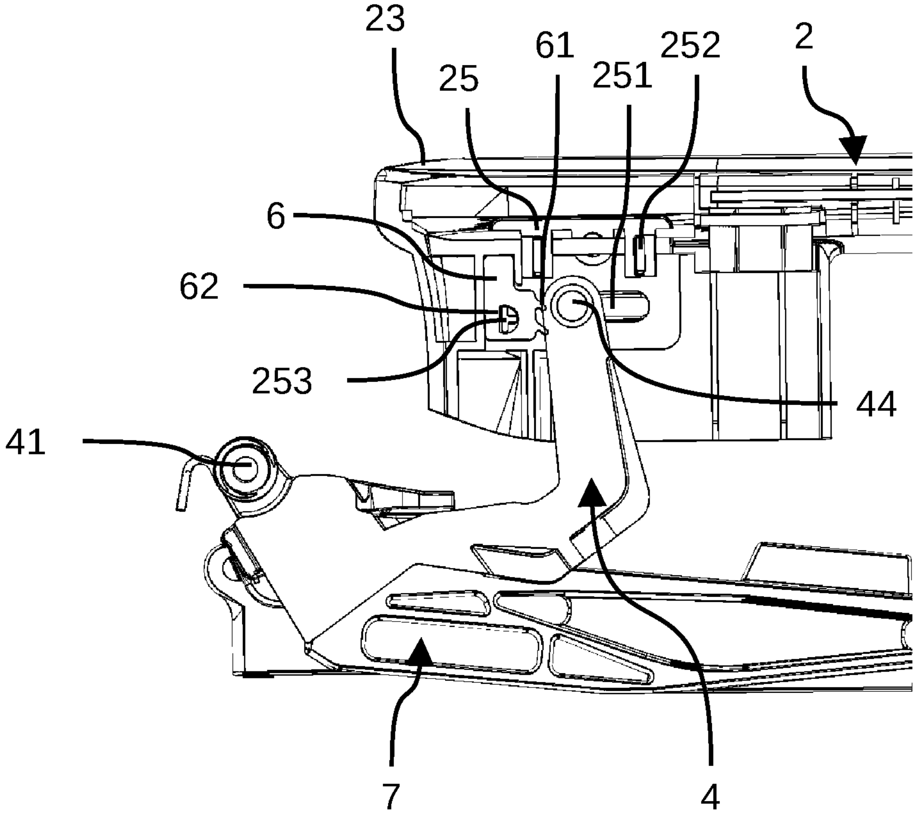

Further features and advantages of the invention will become apparent from the following description, given by way of non-limiting example, with reference to the appended drawings, in which:

FIG. 1 is a side view of a schematic representation of a vehicle door handle assembly in a rest position, FIG. 2 is a side view of a schematic representation of a vehicle door handle assembly in a deployed position, FIG. 3 is a side view of a schematic representation of a vehicle door handle assembly in an opening position, FIG. 4 is a exploded view of the vehicle door handle assembly, FIG. 5 is a view of a fixing clip and a dumper FIG. 6 is a cut view of an extremity of the handle in its opening position, FIG. 7 is a cut view of an extremity of the handle in its deployed position.

In these figures, identical elements bear the same reference numbers. The following implementations are examples. Although the description refers to one or more embodiments, this does not necessarily mean that each reference relates to the same embodiment or that the features apply only to a single embodiment. Individual features of different embodiments can also be combined or interchanged to provide other embodiments.

DETAILED DESCRIPTION

FIG. 1 shows a vehicle door handle assembly 1 in a rest position. The vehicle door handle assembly 1 comprises a bracket 10 and a handle 2. The bracket 10 is designed to be fixed on the vehicle door (not represented). In this rest position, the handle 2 is retracted into the bracket 10 in order to be at the same level of the door body when installed.

The handle 2 comprises a first extremity 22 and a second extremity 23 opposed to the first extremity 22. The first extremity 22 of the handle 2 is connected to a first lever 3 and the second extremity 23 of the handle 2 is connected to a second lever 4.

The first lever 3 is also designed to be connected to an opening lever (not represented) to open a latch of the vehicle door. The first lever 3 is designed to rotate between a rest position (represented in FIG. 1) where the first extremity 22 of the handle 2 is in a rest position, a deployed position (represented in FIG. 2) where the first extremity 22 of the handle 2 is in a deployed position outside the bracket 10 and an opening position (represented on FIG. 3) where the first lever 3 actuates the opening lever.

More precisely, the first lever 3 comprises a pivot connection 33 with the bracket 10 around which the first lever 3 rotates between its different positions. A first extremity of the first lever 3 is connected to the first extremity 22 of the handle 2 and a second extremity of the first lever 3, is connected to the opening lever. The first lever 3 may also comprises an elastic mean 34 (visible in FIG. 2) passively bringing back said first lever 3 from its opening position to its deployed position. This elastic mean 34 may be a spring positioned for example on the pivot connection 33 between the first lever 3 and the bracket 10.

The second extremity 23 of the handle 2 is connected to a second lever 4. The second lever 4 is designed to rotate between a rest position (represented in FIG. 1) where the second extremity 23 of the handle 2 is in a rest position, and a deployed position (represented in FIGS. 2 and 3) where the second extremity 23 of the handle 2 is in a deployed position outside the bracket 10. The second lever 4 comprises a pivot connection 41 with the bracket 10 around which the second lever 4 rotates between its different positions. A first extremity of the second lever 4 is connected to the second extremity 23 of the handle 2.

The connections between the first lever 3 and the first extremity 22 of the handle 2 and between the second lever 4 and the second extremity 23 of the handle 2 comprise preferably a pivot-slide connection and a pivot connection. In the examples represented in FIGS. 1 to 3, the connection between the second lever 4 and the second extremity 23 of the handle 2 is a pivot-slide connection. The second extremity 23 of the handle 2 comprises here a recess 24 and the second lever 4 comprises a slide opening 44 for example to receive a pin (not represented). The connection between the first lever 3 and the first extremity 22 of the handle 2 is here a pivot connection 21.

The first 22 or second 23 extremity of the handle 2, bearing the pivot-slide connection with the first 3 or second 4 lever, may comprises a hollow compartment. The first 3 or second 4 lever may be inserted into this hollow compartment and attached to the first 22 or second 23 extremity of the handle 2. This attachment of the first extremity of the lever 3, 4 could be performed by a first fixing clip 25. An example of a first fixing clip 25 is illustrated with more details in FIG. 5. This first fixing clip 25 comprises an oblong opening 251 in which the pin connected to the first extremity of the lever 3, 4 can slide. The first fixing clip 25 also comprises some hooks 252 to be fixed to the side of the first 22 or second 23 extremity of the handle 2.

The other extremity of the handle 2, bearing the pivot connection with the other lever, may also comprises a hollow compartment. The lever may also be inserted into this hollow compartment and attached to the extremity of the handle 2, for example by a second fixing clip 26.

The first 3 and second 4 levers may be connected together with at least one rod 7 in order to synchronize the movements of the two levers 3, 4. More exactly, the rod 7 transmits the rotation of the second lever 4 from its rest position to its deployed position to the first lever 3, rotating said first lever 3 from its rest position to its deployed position. The rod 7 may comprise a pivot-slide connection with any of the first 3 or second lever 4 so that the first lever 3 can rotate from its rest position to its deployed position or from its deployed position to its opening position without rotating the second lever 4. In the example illustrated in FIGS. 1 to 3, the rod 7 comprises a first extremity connected to a second extremity of the first lever 3 by a pivot connection 32. The rod 7 comprises a second extremity connected to the second lever 4 by a pivot-slide connection. The second extremity of the rod 7 comprises a slide opening 71 and the second extremity of the second lever 4 comprises a pin 42 inserted into said slide opening 71. The handle 2, the first lever 3, the second 4 lever and the rod 7 are designed and connected like a parallelogram and move together synchronously. The other connection of the rod 7 with any of the first 3 or second lever 4 is preferably a pivot connection.

The vehicle door handle assembly 1 could also comprise an actuator 5 connected to the second lever 4 in order to rotate the second lever 4 between its rest position and its deployed position. The actuator 5 could comprise an electric motor 51 in order to pull or push the second lever 4 according to the direction of rotation of said electric motor 51. The actuator 5 may also comprise a slider-crank linkage 52 in order to convert the rotational movement of the electric motor 51 into a linear movement. The slider-crank linkage 52 may be connected directly to a second extremity of the second lever 4 or connected to any of the at least one rod 7. The actuator 5 is preferably installed into a housing (not represented).

The FIGS. 1 to 3 represent the different positions and cinematic steps of the deployment and retraction of the handle 2.

As described above, FIG. 1 is a representation of a rest position where the handle 2 is retracted into the bracket 10 in order to be at the same level of the door body when installed. The first lever 3 and the second lever 4 are in their rest position. These two levers 3 and 4 are maintained in their rest position due to the actuator 5. In this rest position, the inside of the handle 2 may also rest on a rest portion 11 of the bracket 10 placed between the first 22 and second 23 extremities of the handle 2.

FIG. 2 represents a deployed position of the handle 2 where the first lever 3 and the second lever 4 are in their deployed position. These two levers 3 and 4 are maintained in their deployed position due to the actuator 5.

FIG. 3 represents an opening position of the handle 2 where the user can grab the handle 2 and pull it in order to open the vehicle door. When the user pulls the handle 2, it rotates around the pivot connection 21 between the first extremity 22 of the handle 2 and the first lever 3. The first extremity 22 of the handle 2 is pulled in an opening position rotating the first lever 3 from its deployed position to its opening position. The rotation of the first lever 3 is not transmitted to the second lever 4 by the rod 7 due to the pivot-slide connection. When the user releases the handle 2, the first lever 3 rotates back to its deployed position due to its elastic mean 34.

The vehicle door handle assembly 1 also comprises a dumper 6 visible in FIGS. 4 to 7. This dumper 6 is positioned into one of the first 22 or second 23 extremity of the handle 2 in order to dampen the slide of the extremity of the first 3 or second 4 lever in its pivot-slide connection with the handle 2 when the first extremity 22 of the handle 2 move from its opening position to its deployed position. Thus, the movement of the handle 2 from its opening position to its deployed position is slown down and the sound emitted by the handle is soft. For example, the dumper 6 could be positioned into the hollow compartment of the first 22 or second 23 extremity of the handle 2.

The dumper 6 could be an elastic part placed at the extremity of the pivot-slide connection. When the handle 2 is in its opening position, as represented in FIG. 6, the extremity of the first 3 or second 4 lever is not in contact with the dumper 6. When the handle 2 is in its deployed position, as represented on FIG. 7, the extremity of the first 3 or second 4 lever presses the dumper 6.

The dumper 6 could be made of a thermoplastic elastomer. To enhance the quality of the sound emitted by the handle 2, this thermoplastic elastomer may have a hardness of Shore A between 50 and 60, preferably a hardness of Shore A 55.

As represented in FIGS. 5 to 7, the dumper 6 could comprise at least one strip 61 designed to come in contact with the extremity of the first 3 or second 4 lever when the handle 2 is in its deployed position. This strip 61 increases the damping of the first 3 or second 4 lever and the mitigation of the sound.

The dumper 6 could also comprise a recess 62 designed to receive a pin in order to maintain said dumper 6 into the first 22 or second 23 extremity of the handle 2. Advantageously, this pin could be a pin of the fixing clip 25 of the first extremity of the first 3 or second lever 4 to the first 22 or second 23 extremity of the handle 2.

LIST OF REFERENCES

1: vehicle door handle assembly
10: bracket
11: rest bracket
2: handle
21: pivot of the first extremity of the handle
22: first extremity of the handle
23: second extremity of the handle
24: slide opening of the second extremity of the handle
25: first fixing clip
251: oblong opening of the first clip
252: hook of fixation of the first clip
253: pin
26: second fixing clip
3: first lever
32: pivot connection of the first lever with the rod
33: pivot connection of the first lever with bracket
34: elastic mean
4: second lever
41: pivot connection of the second lever with the bracket
42: pivot connection of the second lever with the rod
44: pivot of the second lever with the slide of the second extremity of the handle
5: actuator
51: electric motor
52: slider-crank linkage
53: printed circuit board
6: dumper
61: strip
62: recess of the dumper
7: rod
71: slide of the rod

The invention claimed is:

1. A door handle assembly comprising:

a bracket; and a handle, said handle including a first extremity and a second extremity opposed to the first extremity, the first extremity of the handle being connected to a first extremity of a first lever, said first lever being designed to be connected to an opening lever to open a latch of the vehicle door, said first lever being designed to rotate between a rest position where the first extremity of the handle is in a rest position, a deployed position where the first extremity of the handle is in a deployed position outside the bracket and an opening position where the first lever actuates the opening lever, the second extremity of the handle being connected to a first extremity of a second lever, said second lever being designed to rotate between a rest position where the second extremity of the handle is in a rest position and a deployed position where the second extremity of the handle is in a deployed position outside the bracket, at least one of the first or second lever being connected to its respective first or second extremity of the handle by a pivot-slide connection, wherein the vehicle door handle assembly also comprises a dumper positioned into one of the first or second extremity of the handle in order to dampen the sliding of the extremity of the first or second lever in its pivot-slide connection with the handle when the first extremity of the handle moves from its opening position to its deployed position.

2. The vehicle door handle assembly according to claim 1, wherein the dumper is an elastic part placed at the extremity of the pivot-slide connection, the extremity of the first or second lever pressing the dumper when the handle is in its deployed position.

3. The vehicle door handle assembly according to claim 2, wherein the dumper is made of a thermoplastic elastomer.

4. The vehicle door handle assembly according to claim 3, wherein the thermoplastic elastomer has a hardness of Shore A between 50 and 60, preferably a hardness of Shore A 55.

5. The vehicle door handle assembly according to claim 2, wherein the dumper comprises at least one strip designed to come in contact with the extremity of the first or second lever when the handle is in its deployed position.

6. The vehicle door handle assembly according to claim 1, wherein the first or second extremity of the handle bearing the pivot-slide connection with the first or second lever has a hollow compartment, the first or second lever being inserted into this hollow compartment, and wherein the dumper is also positioned onto this hollow compartment.

7. The vehicle door handle assembly according to claim 5, wherein the dumper comprises a recess designed to receive a pin in order to maintain said dumper into the first or second extremity of the handle.

8. The vehicle door handle assembly according to claim 6, wherein the pin is a pin of a fixing clip of the extremity of the first or second lever to the first or second extremity of the handle.

* * * * *